Oct. 20, 1959      W. OPSITNIK      2,909,305

INSULATED CONTAINER WITH POURING SPOUT AND AIR VENT

Filed Oct. 30, 1957

INVENTOR.
WILLIAM OPSITNIK

BY *W. B. Harpman*

ATTORNEY

United States Patent Office 2,909,305
Patented Oct. 20, 1959

2,909,305

INSULATED CONTAINER WITH POURING SPOUT AND AIR VENT

William Opsitnik, Youngstown, Ohio

Application October 30, 1957, Serial No. 693,398

1 Claim. (222—466)

This invention relates to an insulated container sometimes referred to as a "vacuum jug" in which foods, liquids and the like may be kept at a desired temperature.

The principal object of the invention is the provision of a food container of the jug-type having a carrying handle arranged to automatically open an air vent in the jug when the jug is tipped into pouring position.

A further object of the invention is the provision of an insulated container having a pouring outlet on one side and a vent on the opposite side and a handle intermediate the pouring outlet and air vent arranged to engage the air vent valve so as to open the same when the jug is tilted as in pouring the contents therefrom.

A still further object of the invention is the provision of an insulated container of the jug-type having an access opening, a pouring opening and a vent, and a normally closed vent valve in said vent opening and a handle for carrying said jug arranged to engage said valve so as to open the same when the jug is supported on said handle and tipped to pour the contents of the jug through the pouring opening.

The insulated container disclosed herein is illustrated as comprising an inner and an outer casing having insulating material thereabout. It will occur to those skilled in the art that a double walled vacuum containing structure may be alternately employed. In either event, the food container disclosed herein is provided with a pouring spout and air vent in oppositely disposed relation and a pivoted handle intermediate the same by means of which the insulated container is normally held.

In the present disclosure the handle is arranged so that it will move into position against the air vent valve so as to open the same when the insulated container is moved to pour the contents from the pouring opening thereby facilitating the pouring of the contents by admitting air to the container through the air vent opening.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
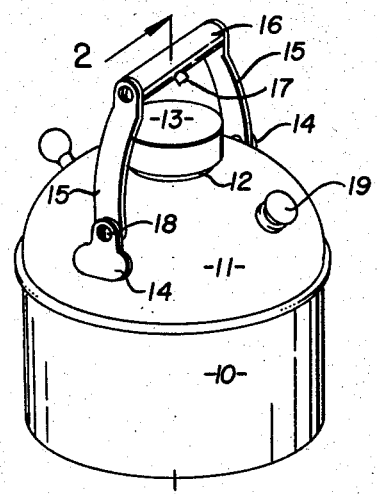
Figure 1 is a perspective view formed in accordance with the invention.

By referring to the drawing and Figure 1 in particular it will be seen that an insulated container such as a food container includes a cylindrical body member 10 having a dome-shaped uppermost portion 11. The upper part of the dome-shaped portion 11 is provided with a throat 12 which is externally threaded and receives and retains a closure cap 13. On either side of the throat 12 and attached to the dome-shaped portion 11 there are brackets 14—14 to which the ends of a handle 15 are pivoted.

The intermediate portion of the handle 15 is preferably circular in cross section, as indicated at 16, and provided with an outwardly and downwardly extending detent 17. It will be observed that the handle 15 will move in an arc based on pivots 18 by which the ends thereof are secured to the brackets 14—14.

Figure 3:
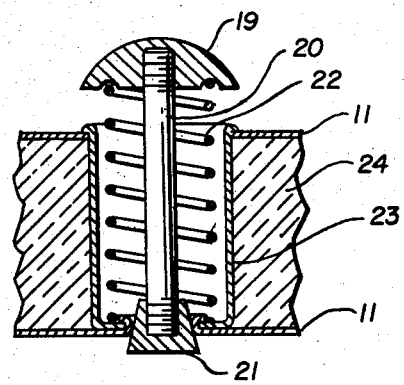
Figure 3 is an enlarged cross sectional detail taken on line 3—3 of Figure 2.
Figure 2:
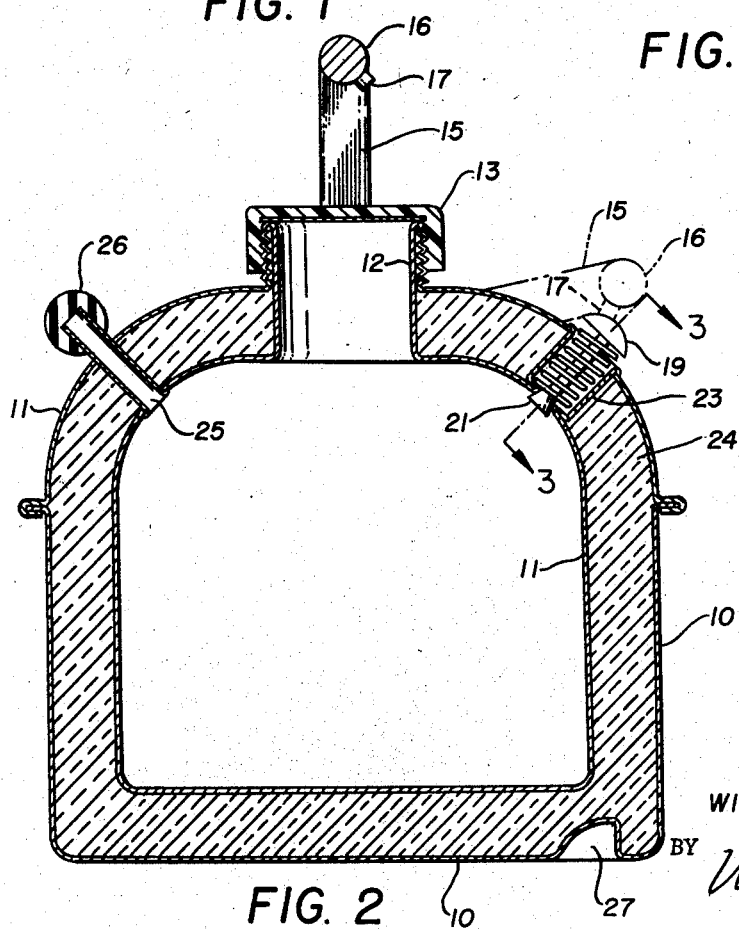
Figure 2 is an enlarged vertical section through the insulated container shown in Figure 1.

Positioned through the dome-shaped portion 11 and on the arcuate path on which the detent 17 will move, there is a vent valve 19, the innermost portion of which includes a stem 20 and a valve element 21 arranged in oppositely disposed relation, as shown in Figures 2 and 3 of the drawing.

A coil spring 22 is disposed between the vent valve 19 and an inturned end of a cylindrical mounting member 23 in which the vent valve 19 is located. The cylindrical member 23 extends through the double walls of the dome-shaped portion 11 between which there is interposed insulating material 24 or, alternately, a vacuum enclosing structure as will occur to those skilled in the art.

In either event the valve element 21 will normally close the opening and be maintained in such closed position by the coil spring 22. The dome-shaped portion 11 is provided on the opposite side thereof with respect to the vent valve 19 with a pouring spout 25 which in turn is provided with a closure 26.

It will be observed by referring to Figure 2 of the drawing that the bottom of the insulated container 10 is provided with a hand-hold 27 so that the insulated container is advantageously picked up by the handle 15, and more specifically by the cross sectionally circular center portion 16 of the handle 15, and the other hand of the person holding the device being engaged in the hand-hold 27. The contents of the insulated container may thus be readily poured through the pouring spout 25. When the insulated container 10 is in such position, the detent 17 will engage the vent valve 19 and open it, as shown in Figure 3 of the drawing by the broken line illustration of the handle 15 and detent 17.

Thus, air is vented into the insulated container 10, the pouring of the liquid is facilitated and at such time as the container 10 is returned to upright position, the air vent 19 will re-assume its normal position as urged by the spring 22, whereupon the element 21 will again close the opening, all as aforesaid.

It will thus be seen that an unusually practical arrangement is provided by means of which air may be vented into an insulated container simultaneously with the pouring of the contents therefrom by the expedient of utilizing the detent 17 on the handle 15 to operate the valve element 21.

It will thus be seen that the several objects of the invention have been met by the insulated container with pouring spout and air vent disclosed herein.

Having thus described my invention, what I claim is:

In an insulated container having a normally closed access opening, and a pouring opening on one side thereof, an air vent valve on the opposite side thereof with respect to said pouring opening, said air vent valve comprising a cylindrical member positioned through one of the walls of said insulated container, a coil spring disposed in said cylindrical container and a shaft disposed in said coil spring and having a valve element on the inner end thereof, and a valve cap on the outer end thereof, a handle pivotally secured to said insulated container midway between said pouring opening and said air vent valve and movable in an arcuate path in line with said air vent valve, said handle having an outwardly extending portion thereof arranged to engage said valve cap of said air vent valve when moved in said arcuate path so as to open the same when same insulated container is tilted with respect to said handle.

References Cited in the file of this patent

UNITED STATES PATENTS

| | | |
|---|---|---|
| 1,266,463 | Herbert | May 14, 1918 |
| 1,762,637 | McCarthy | June 10, 1930 |
| 2,117,276 | Davis | May 17, 1938 |